Patented Feb. 11, 1936

2,030,461

UNITED STATES PATENT OFFICE 2,030,461

GRANULAR PRODUCT CONDITIONER AND PRODUCTS MADE THEREWITH

Henry V. Moss, St. Louis, Mo., assignor to Swann Research, Incorporated, a corporation of Alabama No Drawing. Application July 12, 1933, Serial No. 680,155

12 Claims. (Cl. 99—11)

This invention relates to a granular product conditioner and products conditioned therewith, and particularly relates to a tricalcium phosphate product admixed with starch which I have found will develop valuable properties when mixed with various granular, crystalline or amorphous materials.

I am aware that both tricalcium phosphate and starch have been proposed or used, separately, as conditioners for various granular products such as sugar, salts of various kinds, powdered milk, cocoa and sundry other materials, to increase the free-flowing and non-caking properties of these materials. However, so far as I am aware, no one has ever proposed the use of mixtures of these substances.

The valuable properties imparted by my conditioner are particularly the increased flowability of the granular product containing the conditioner, which is of great importance for packaging operations in which granular or crystalline materials are loaded by machine into cartons.

As illustrative of the improved flowability imparted to granular or crystalline materials, I cite some experimental results made with powdered sugar to which varying proportions of tricalcium phosphate-starch mixtures had been added.

The experiments were made by incorporating various percentages of tricalcium phosphate-starch mixtures with powdered sugar, and then determining the rate of flow of the mixture through a standard powder flow-meter. The results obtained were as follows:—

*Rate of flow, grams per minute*

Powdered sugar alone_____ 12.8
Powdered sugar+1% tricalcium phosphate_ 21.7
Powdered sugar+1% starch_____ 15.7
Powdered sugar+1% (mixture of 1 part tricalcium phosphate+1 part starch)____ 22.1
Powdered sugar+1% (mixture of 0.6 part tricalcium phosphate+0.4 part starch)___ 25.3
Powdered sugar+1% (mixture of 0.7 part tricalcium phosphate+0.3 part starch)___ 28.7
Powdered sugar+1% (mixture of 0.8 part tricalcium phosphate+0.2 part starch)___ 43.2
Powdered sugar+1% (mixture of 0.9 part tricalcium phosphate+0.1 part starch)___ 46.6

A similar series of experiments were made using 2% of a mixture of tricalcium phosphate and starch. With this proportion of conditioner, the following increased rates of flow, when compared with the conditioned product, were obtained:—

| Composition of mixture | | Rate of flow |
|---|---|---|
| Parts tricalcium phosphate | Parts starch | Pure sugar= 100 percent |
| | | Percent |
| 0.5 | 0.5 | 361 |
| 0.6 | 0.4 | 329 |
| 0.7 | 0.3 | 328 |
| 0.8 | 0.2 | 432 |
| 0.9 | 0.1 | 558 |

In all results cited above, I have obtained greater rates of flow with my conditioned product than with a sugar conditioned with starch alone or with tricalcium phosphate alone; and I have furthermore obtained results in some of the experiments indicating that the effect of the tricalcium phosphate-starch mixture gives rates of flow considerably greater than the sum of these two constituents separately.

While I have disclosed in the above-mentioned results compositions ranging from equal parts of tricalcium phosphate and starch to compositions containing 9 parts of tricalcium phosphate to 1 part of starch, I may use other proportions of these ingredients for certain purposes. For many purposes, as for example, when preparing conditioned sugar of either the granulated or powdered variety, or milk, compositions containing lesser amounts of the first ingredient may be advantageously used, since the starch ingredient is considerably cheaper. I may therefore obtain equal or greater flow effects using a mixture with relatively more starch than tricalcium phosphate at lower cost than was possible using either tricalcium phosphate or starch alone as a conditioner. In some cases I prefer to use starch-tricalcium phosphate mixtures containing in the range of 20 parts of the phosphate to 80 parts of starch.

The tricalcium phosphate which I use in my composition may be either the pure compound, $Ca_3(PO_4)_2$, in which the molar ratio of CaO to $P_2O_5$ is as 3 to 1, or it may include a compound in which the ratio is as high as 3.4 to 1, which is a compound more basic than the usual tribasic phosphate.

It is not necessary, furthermore, to have an absolutely dry tricalcium phosphate. I have found, for example, that a product having between 6% and 12% ignition loss, and hence possessing a water content equivalent to a definite mono- or dihydrate, is an equally effective conditioner as a tricalcium phosphate having a smaller amount of water.

The tricalcium phosphate may have present with it certain other phosphates, namely, the iron and/or the aluminum phosphates. For most conditioned food products, I prefer to use the aluminum phosphate because of the lighter color obtained therewith. Such phosphate is preferably present in relatively small amount, say from 2% to 10% by weight, of the total phosphate.

The starch employed in making my conditioner may be either the finely powdered corn starch or the starches extracted from potatoes, wheat or from other fruits, vegetables or grains.

The proportion of conditioner comprising mixtures of tricalcium phosphate and starch to be employed with various granular, crystalline or amorphous products to be rendered stable and free-flowing, may vary from a rather small percentage to as much as 10% or 15% by weight. When preparing a conditioned powdered or granulated sugar, I employ from 1% to 5%, say 2%; while when preparing a conditioned milk powder, I prefer to incorporate from 2% to 6% by weight of the conditioner. Other conditioned products such as cocoa, powdered eggs or egg whites, albumin, powdered gelatine, amorphous sulfur, etc., are satisfactorily conditioned with from 1% to 15% of the conditioner by weight.

Incorporation of the conditioner with the granular, crystalline or amorphous product is preferably accomplished by first making a pilot mixture containing a relatively large percentage of the conditioner and then making a further dilution with the product to be conditioned, in the proper proportions.

While I have described my invention in but one form, it will be understood that it is not so limited but is susceptible to various changes and modifications without departing from the spirit thereof, and I desire that only such limitations be imposed thereupon as may be indicated by the prior art or as are specifically set forth in the appended claims.

What I claim is:—

1. A conditioner for granular, crystalline or amorphous products comprising a mixture of tricalcium phosphate and starch, said mixture containing not less than 50% of tricalcium phosphate.

2. A conditioner for granular, crystalline or amorphous products comprising a mixture of tricalcium phosphate, aluminum phosphate and starch, said mixture containing, in the aggregate, not less than 50 per cent of tricalcium phosphate and aluminum phosphate.

3. A free-flowing granular or crystalline product containing a small proportion of a conditioner comprising a mixture of tricalcium phosphate and starch, said mixture containing not less than 50% of tricalcium phosphate.

4. A free-flowing granular or crystalline product containing up to 15% of a conditioner comprising a mixture of tricalcium phosphate and starch, said mixture containing not less than 50% of tricalcium phosphate.

5. A free-flowing granular or crystalline product containing a small proportion of a conditioner comprising a mixture of tricalcium phosphate, aluminum phosphate and starch, said mixture containing not less than 50% of tricalcium phosphate.

6. A free-flowing granular or crystalline product containing a conditioner comprising a mixture of tricalcium phosphate and starch, said mixture being in such proportions as to increase the rate of flow of the conditioned product above that possessed by tricalcium phosphate alone.

7. A free-flowing sugar containing a conditioner comprising a mixture of tricalcium phosphate and starch, said mixture containing not less than 50% of tricalcium phosphate.

8. A free-flowing powdered sugar containing a conditioner comprising a mixture of tricalcium phosphate and starch, the conditioner being present in amount up to 5% by weight of said conditioned product, said conditioners containing at least 50% of tricalcium phosphate.

9. A free-flowing sugar containing a conditioner comprising a mixture of tricalcium phosphate and starch, said mixture containing at least 50% of tricalcium phosphate.

10. A free-flowing sugar containing a conditioner comprising a mixture of tricalcium phosphate and starch, together with a relatively small amount of aluminum phosphate, said mixture containing at least 50% of tricalcium phosphate.

11. A conditioned granular or crystalline product containing a conditioner comprising a mixture of tricalcium phosphate and starch, said mixture containing at least 50% of tricalcium phosphate.

12. Free-flowing powdered sulfur containing a conditioner comprising a mixture of tricalcium phosphate and starch, said mixture containing at least 50 per cent of tricalcium phosphate.

HENRY V. MOSS.